US010885488B2

(12) United States Patent
Madison et al.

(10) Patent No.: US 10,885,488 B2
(45) Date of Patent: *Jan. 5, 2021

(54) SYSTEM FOR ACCESSING BUSINESS METADATA WITHIN A DISTRIBUTED NETWORK

(71) Applicant: HARTFORD FIRE INSURANCE COMPANY, Hartford, CT (US)

(72) Inventors: James A. Madison, Windsor, CT (US); Balachandar Kandaswamy, Southington, CT (US); Teresa Mullen-Sweeney, Glastonbury, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/036,460

(22) Filed: Jul. 16, 2018

(65) Prior Publication Data

US 2018/0322438 A1    Nov. 8, 2018

Related U.S. Application Data

(63) Continuation of application No. 14/499,703, filed on Sep. 29, 2014, now Pat. No. 10,026,051.

(51) Int. Cl.
*G06Q 10/06*    (2012.01)
*G06F 16/25*    (2019.01)

(52) U.S. Cl.
CPC ....... *G06Q 10/06398* (2013.01); *G06F 16/25* (2019.01)

(58) Field of Classification Search
CPC ........................................ G06Q 10/06
USPC ....... 707/610, 722, 754, 609, 740, 741, 755, 707/769, 625, 724, 736, 737, 738, 743, 707/756, 758, 771, 805, 827; 726/1, 4, 726/11, 27, 28; 709/223, 231, 204, 206, 709/213, 217, 219, 246; 705/14.41, 30, 705/37, 7.36
See application file for complete search history.

(56) References Cited

U.S. PATENT DOCUMENTS

| 6,101,515 | A | * | 8/2000 | Wical | ...................... G06F 9/453 715/708 |
| 8,074,202 | B2 | | 12/2011 | Da Palma et al. | |
| 8,645,396 | B2 | | 2/2014 | McNally et al. | |

(Continued)

*Primary Examiner* — Ken Hoang
(74) *Attorney, Agent, or Firm* — Volpe and Koenig, P.C.

(57) ABSTRACT

A system for accessing business metadata within a distributed network is disclosed. The system facilitates metadata driven for using social constructs in combination with metadata management to enhance metadata. The system includes a data storage device configured to store business information and metadata related to the business information, a processor configured to: selectively receive rated user input that provides supplemental information regarding at least one of the business information and the metadata, determine the context of the supplemental information and the at least one of the business information and the metadata; template the supplemental information by type and using pointers in the system provide non-redundancy, store the organized supplemental information in the data storage device, and generate a user interface element, and a display device configured to display the user interface element as the definition of the business information.

15 Claims, 18 Drawing Sheets

(56) References Cited

U.S. PATENT DOCUMENTS

| | | |
|---|---|---|
| 9,633,115 B2 | 4/2017 | Byrne et al. |
| 2006/0085750 A1 | 4/2006 | Easton, Jr. et al. |
| 2006/0224617 A1 | 10/2006 | Inmon |
| 2009/0157490 A1 | 6/2009 | Lawyer |
| 2009/0187442 A1 | 7/2009 | Kohanim et al. |
| 2012/0130723 A1 | 5/2012 | Bhattacharjee |
| 2014/0095396 A1 | 4/2014 | Naghshin et al. |
| 2014/0101112 A1 | 4/2014 | Bantivoglio, III |
| 2014/0129639 A1 | 5/2014 | Burge |
| 2016/0004711 A1* | 1/2016 | Soon-Shiong ...... G06F 16/9566 715/205 |

* cited by examiner

Special Page

Create account &

Read Edit View history | prod_ro_cd

Search results

| prod_ro_cd | Search |

Content pages   Multimedia   Help and Project pages   Everything   Advanced

Showing below up to 20 results starting with # 1210

Create the page "Prod ro cd" on this wiki!

ADM AGENCY AGGR FACT
* [(PROD_RO_CD in ADM_AGENCY_AGGR_FACT|PROD_RO_CD)]- Producing Regional Office Code
5 KB (1,042 WORDS)- 13:35, 2 July 2014

ADM POL MSTR DIM
* [(PROD_RO_CD in ADM_POL_MSTR_DIM|PROD_RO_CD)]- Producing Regional Office Code
2 KB (430 WORDS)- 13:35, 2 July 2014

WC POL FW
* [(PROD_RO_CD in WC_POL_FW|PROD_RO_CD)]- Producing Regional Office Code
27 KB (5,432 WORDS)- 13:35, 2 July 2014

ADM POLICY DIM
* [(PROD_RO_CD in ADM_POLICY_DIM|PROD_RO_CD)]- Producing Regional Office Code
5 KB (895 WORDS)- 13:35, 2 July 2014

ADM BILLING AGGR FACT
* [(PROD_RO_CD in ADM_BILLING_AGGR_FACT|PROD_RO_CD)]- Producing Regional Office Code
4 KB (664 WORDS)- 13:35, 2 July 2014

ADM CLAIM DIM
* [(PROD_RO_CD in ADM_CLAIM_DIM|PROD_RO_CD)]- Producing Regional Office Code
2 KB (418 WORDS)- 13:35, 2 July 2014

NON HIG INDEM CLM PRR YR 1 CNT in WC POL AGGR FACT
PROD_RO_CD
2 KB (317 WORDS)- 13:36, 2 July 2014

NON HIG INDEM CLM PRR YR 2 CNT in WC POL AGGR FACT
PROD_RO_CD
2 KB (317 WORDS)- 13:36, 2 July 2014

NON HIG INDEM CLM PRR YR 3 CNT in WC POL AGGR FACT
PROD_RO_CD thd1007/metawiki/index.php/Main_Page Local intranet | Protected Mode: Off

*FIG. 3*

Page Discussion                                                                                     Create account &

Read Edit View history  Search

PROD RO CD in ADM CLAIM DIM

Full Path:       Assets | ADM_ADM_CLAIM_DIM |
Business Name:   Producing Regional Office Code
Definition:      The code which represents the regional office that underwrote the policy ← 1310
Data Type:       VARCHAR2(3)

Contents [hide]
1. Lineage
2. Valid Values
3. Content
4. Example
5. Known issues
6. System of Record
7. Edits and Transformations
  7.1 Downstream Use
8. Ownership
9. Subject Matter Experts Lineage  [edit]

Move Type:             Straight
Source Asset:          BKF
Source Schema:         BKF_DATA
Source Table:          CLAIM_LOSS_COMPOSITE_AY_ME
Source Field:          PRODUCING_REGIONAL_OFFICE_CO
Source Data Type/Size: CHAR (3)
Business Rule:         substr(PRODUCING_REGIONAL_OFFICE_CD.2.2 )
Technical Rule:        (no input)

Valid Values  [edit]

Local intranet | Protected Mode: Off

*FIG. 4*

Template  Discussion                                Read  Edit  View history  [Search]

The code which represents the regional office that underwrote the policy
Template:PROD RO CD The code which represents the regional office that underwrote the policy  ← 1410
Business Name:  Producing Regional Office Code This page was last modified on 11 August 2014, at 11:05.
This page has been accessed 7 times.
Privacy policy  About metawiki  Disclaimers

FIG. 5

Template Discussion

What do you think of this page?
Please take a moment to rate this page below. Your feedback is valuable and helps us improve our website.
Reliability: [unsure] ▶ Completeness: [unsure] ▶ Neutrality: [unsure] ▶ Presentation: [unsure] ▶ [Submit]
Excellent
High
Fair
Low
Poor
1110    1120    1130    1140

This page was last August 2014, at 9:20.
This page has been [unsure] es.

Read  Edit  View history  [Search]

Create account &

Category | Discussion — 210

Read  Edit  View history  | Search | 🔍 |

Create account & Log in

Category:Data Asset — 220

A data asset is the general name for any variety of warehouses, marts, reports, staging areas, feeds, or any other construct capable of holding data, such that the construct is in some way directly accessed by business decision makers.

Pages in category "Data Asset"

This category contains only the following page. — 230

A
- ADM — 240

This page was last modified on 28 March 2014, at 12:48.
This page has been accessed 13 times.
Privacy policy  About metawiki  Disclaimers Main page
Report changes
Random page

- Tools
What links here
Related changes
Special pages
Printable version
Permanent link
Page information

| | Create account & \| Log in |
|---|---|
| Category Discussion 240 310 | Read Edit View history [Search] |

ADM

ADM is a Research Data Asset which will contain all core commercial data, in one "mart", regardless of source. This will allow easy access to data across sources, and ensure consistency, reusability and accuracy.

Main page
Report changes
Random page

- Tools
  What links here
  Related changes
  Special pages
  Printable version
  Permanent link
  Page information

Tables   [edit]

- RERATED_WC_POL_FACT- Re-rated Earned and written premiums, exposures, losses and developed losses at the policy level.
- RERATED_WC_POL_ST_FACT- Re-rated Earned and written premiums, exposures, losses and developed losses at the policy/state level.
- RERATED_WC_PREM_FACT- Re-rated transaction level written premiums, exposures and mods at the lowest grain (policy/state/class/location).
- WC_CLAIM_FACT- Claim details (loss amounts, developed losses, nature of injury, etc.).
- WC_POL_AGGR_FACT- Earned and written premiums, exposures, losses and developed losses at the policy level.
- WC_POL_FW- Policy-level flat/wide table (attributes and metrics).
- WC_POL_ST_AGGR_FACT- Earned and written premiums, exposures, losses and developed losses at the policy/state level.
- WC_POL_ST_CLSS_AGGR_FACT- Earned and written premiums, exposures, losses and developed losses at the policy/state/class level.
- WC_POL_ST_CLSS_AGGR_FACT- Earned and written premiums, exposures, losses and developed losses at the policy/state/class level.
- WC_POL_ST_CLSS_FW- Policy/state.class-level flat/wide table (attributes and metrics).
- WC_POL_ST_FW- Policy/state-level flat/wide table (attributes and metrics).
- WC_POL_ST_FW- Policy/state-level flat/wide table (attributes and metrics).
- WC_PREM_FACT- Re-rated transaction level written premiums, exposures and mods at the lowest grain (policy/state/class/location).
- ADM_POLICY_DIM- WC policy-level attributes.
- ADM_CLAIM_DIM- WC claim and claimant attributes.
- ADM_AGENCY_AGGR_FACT- Agency related attributes and metrics.
- ADM_BILLING_AGGR_FACT- Billing related attributes and Metrics.
- ADM_POL_MSTR_DIM- ADM eligible policies driver table with various indicators on eligibility.
- 320a→ADM_ACCOUNT_DIM- Account-level attributes. (e.g. years with HIG).
- ADM_SNAPSHOT_FACT- "Factless" bridge table to CLDW.

} 320

Content Experts   [edit]

Terry Mullen-Sweeney and Jim King——330

340—Questions and Answers   [edit]

Please post any questions on the "Discussion" tab. Edits to this page or the discussion tab produce notifications to the above Content Experts.

Category: Data Asset

This page was last modified on 4 August 2014, at 15:09.
This page has been accessed 18 times.

*FIG. 9*

Create account & | Log in

Page  Discussion           320a              Read  Edit  View history  [Search            Q]

ADM ACCOUNT DIM     410

Full Path:    Assets | ADM | ADM_ACCOUNT_DIM

Description:  The Account Dimension contains information sourced from the Account Insured Facility (AIF) containing information about the account.
420

Main page
Report changes
Random page
▼Tools
 What links here
 Related changes
 Special pages
 Printable version
 Permanent link
 Page information

Columns       [edit]

- ACCT_ID- Account Identifier
- ADM_ACCT_GID- [no input]
- ADM_ACCT_PK_ID- [no input]
- BATCH_ID- [no input]
- BEGINNING_CONS_EFF_YR- Beginning Consecutive Effective Year
- BUS_EFF_END_TMSP- [no input]
- BUS_EFF_START_TMSP- [no input]
- DW_LST_UPD_TMSP- [no input]
- DW_POP_TMSP- [no input]
- HIG_ACCT_YRS_NUM- HIG Account Years Number
- HIG_CONS_YRS_NUM- HIG Consecutive Years Number
- ORIG_ACCT_EFF_YR- Original Account Effective Year
- POL_EFF_YR- Policy Effective Year
- POL_STATUS_CO- [no input]
- SRCE_EFF_END_TMSP- [no input]
- SRCE_EFF_START_TMSP- [no input]
- SRCE_SYS_CD- [no input]

430

Categories:   ADM Table List  |  Commercial Table List

This page was last modified on 8 April 2014, at 21:17.
This page has been accessed 128 times.
Privacy policy   About metawiki   Disclaimers

Page Discussion                                    Read Edit View history  Create account & Log in
                                                                          Search

BEGINNING CONS EFF YR in ADM ACCOUNT DIM ← 510

Full Path:        Assets | ADM | ADM_ACCOUNT_DIM | BEGINNING_CONS_EFF_YR ← 515
Business Name:    Beginning Consecutive Effective Year ← 520
Definition:       The First year of the most recent string (consecutive) of active account years. ← 525
Data Type:    NUMBER(4) ← 530

┌─ Contents [hide] ─────────┐
│ 1. Lineage                │
│ 2. Valid Values           │
│ 3. Context                │  ← 535
│ 4. Example                │
│ 5. Known issues           │
│ 6. System of Record       │
│ 7. Edits and Transformations │
│   7.1. Downstream Use     │
│ 8. Ownership              │
│ 9. Subject Matter Experts │
└───────────────────────────┘

Lineage   [edit]

Move Type:           Derived
Source Asset:        CLDW
Source Scheme:       CLDW_ADM                          ⎫
Source Table:        ADM_POLICY_DIM                    ⎬ ← 540
Source Field:        ACCT_ID.POL_EFF_YR                ⎪
Source Data Type/Size: VARCHAR2(30)                    ⎪
                     NUMBER(4)                         ⎭

Valid Values

Self-explanatory

Main page
Report changes
Random page
▼ Tools
  What links here
  Related changes
  Special pages
  Printable version
  Permanent link
  Page information

Valid Values [edit]

Self-explanatory }—545

CONTEXT [edit]

Used to calculate the Number of Consecutive Years with HIG and the LOB Consecutive Years with HIG }—550

EXAMPLE [edit]

ACCT_ID POL_EFF_YR
1234 2005
1234 2007
1234 2008
1234 2009
1234 2010
Beginning Consecutive Year is 2007 }—555

Known Issues [edit]

At this point the earliest effective year will 2005 due to the history attached to the Account ID. This will be corrected in June 2014 }—560

System of Record [edit]

A/F. and 10% qalso sdfsdflsdf CLA }—565

Edits and Transformations [edit]

Not applicable. }—570

Downstream Use [edit]

Used to create Number of years with HIG and Number of Years LOB with HIG. These fields are used in the WC model. }—575

Ownership [edit]

Terry Mullen-Sweeney, Jim King and Bala }—580

Subject Matter Experts [edit]

Terry Mullen-Sweeney, Jim King }—585

Category Discussion
Category: ADM Column List—610

The list of all columns available in ADM. See also ADM Table List
Pages in category "ADM Column List"—620

The following 200 pages are in this category, out of 1,559 total.
(previous 200) (next 200)

Read Edit View history [Search]  Create account & Log in

A
- ADM: KEY OFF CO in ADM CLAIM DIM
- ACCT ID in ADM ACCOUNT DIM
- ACCT ID in ADM ACCOUNT LOB DIM
- ACCT ID in ADM POLICY DIM
- ACCT ID in WC POL AGGR FACT
- ACCT ID in WC POL FW
- ADJ AVG WKLY WAGE AMT in WC CLAIM FACT
- ADM ACCT GID in ADM ACCOUNT DIM
- ADM ACCT LOB GID in ADM ACCOUNT LOB DIM
- ADM ACCT LOB PK ID in ADM ACCOUNT LOB DIM
- ADM ACCT PK ID in ADM ACCOUNT DIM
- ADM ACCT PK ID in ADM SNAPSHOT DIM
- ADM CLM GID in ADM CLAIM DIM
- ADM CLM PK ID in ADM CLAIM DIM
- ADM ELGBL in ADM POL MSTR DIM
- ADM EXCLUSION REASON DESC in ADM POL MSTR DIM
- ADM LR in WC POL ST AGGR FACT
- ADM LR PRM WT in WC POL ST AGGR FACT
- ADM POL PK ID in ADM POLICY DIM
- ADM POL PK ID in ADM SNAPSHOT FACT
- ADM POL PK ID in WC CLAIM FACT
- ADM POL PK ID in WC POL AGGR FACT
- ADM POL PK ID in WC POL FW
- ADM POL PK ID in WC POL ST AGGR FACT
- ADM POL PK ID in WC POL ST CLSS AGGR FACT

A cont.
- AGNT GID in RERATED WC POL FACT
- AGNT GID in RERATED WC POL ST FACT
- AGNT GID in RERATED WC PREM FACT
- AGNT GID in WC POL AGGR FACT
- AGNT GID in WC POL FW
- AGNT GID in WC POL ST AGGR FACT
- AGNT GID in WC POL ST CLSS AGGR FACT
- AGNT GID in WC POL ST CLSS FW
- AGNT GID in WC POL ST FW
- AGNT GID in WC PREM FACT
- AGNT LOC PK ID in WC PREM FACT
- AGNT PK ID in ADM POL MSTR DIM
- AGNT PK ID in RERATED WC POL FACT
- AGNT PK ID in RERATED WC POL ST FACT
- AGNT PK ID in RERATED WC PREM FACT
- AGNT PK ID in WC PREM FACT
- AGNT TRANS PK ID in RERATED WC PREM FACT
- AGNT TRANS PK ID in WC PREM FACT
- AS OF DATE in WC POL FW
- AS OF DATE in WC POL ST CLSS FW
- AS OF DATE in WC POL ST FW
- AS OF DT in RERATED WC POL FACT
- AS OF DT in RERATED WC POL ST FACT
- AS OF DT in RERATED WC PREM FACT
- AS OF DT PK ID in WC CLAIM FACT
- AS OF MONTH in ADM CRDBLTY THRSHLD RULE

B cont.
- BLACK LUNG CNT in WC POL ST CLSS FW
- BLACK LUNG CNT in WC POL ST FW
- BLDG NUM in ADM CLAIM DIM
- BURN CNT in WC POL AGGR FACT
- BURN CNT in WC POL FW
- BURN CNT in WC POL ST AGGR FACT
- BURN CNT in WC POL ST CLSS AGGR FACT
- BURN CNT in WC POL ST CLSS FW
- BURN CNT in WC POL ST FW
- BUS EFF END TMSP in ADM ACCOUNT DIM
- BUS EFF END TMSP in ADM ACCOUNT LOB DIM
- BUS EFF END TMSP in ADM CLAIM DIM
- BUS EFF END TMSP in ADM POL MSTR DIM
- BUS EFF END TMSP in ADM POLICY DIM
- BUS EFF START TMSP in ADM ACCOUNT DIM
- BUS EFF START TMSP in ADM ACCOUNT LOB DIM
- BUS EFF START TMSP in ADM CLAIM DIM
- BUS EFF START TMSP in ADM POL MSTR DIM
- BUS EFF START TMSP in ADM POLICY DIM

C
- CAL YTD EPAPR AMT in WC POL AGGR FACT
- CAL YTD EPAPR AMT in WC POL FW
- CAL YTD EPAPR AMT in WC POL ST AGGR FACT
- CAL YTD EPAPR AMT in WC POL ST CLSS AGGR FACT
- CAL YTD EPAPR AMT in WC POL ST CLSS FW

Special page

Create account & | Log in

Search

Popular pages —710

Showing below up to 50 results starting with #1
View (previous 50 | next 50) (20 | 50 | 100 | 250 | 500)

720

1. ADM (273 views)
2. ADM ACCOUNT DIM (127 views)
3. ADM.Person.Gender Cd (102 views)
4. POL SYM CD (61 views)
5. PRODUCTION DT (69 views)
6. BEGINNING CONS EFF YR (51 views)
7. Main Page (50 views)
8. ADM POLICY DIM (43 views)
9. AS OF YEAR (45 views)
10. ADM CLAIM DIM (45 views)
11. Hack (43 views)
12. BEGINNING CONS EFF YR in ADM ACCOUNT DIM (38 views)
13. WC CLAIM FACT (33 views)
14. Data Assets (24 views)
15. AS OF MONTH (20 views)
16. ADM CRDBLTY THRSHLD RULE (14 views)
17. ORIG ACCT EFF YR in ADM ACCOUNT DIM (13 views)
18. ADM ACCOUNT LOG DIM (13 views)
19. ACCT ID (12 views)
20. AGCY CLM PRR YR 3 CNT (11 views)
21. ADM.ADM POLICY DIM.POL SYM CD (11 views)
22. MD TTL MED ULT AMT (10 views)
23. ADM CLM GID in ADM CLAIM DIM (10 views)
24. ADM.Person (10 views)
25. POL SYM CD in ADM POLICY DIM (9 views)
26. ADM POL MSTR DIM (8 views)
27. POL EFF YR (7 views)
28. ACCT ID in ADM ACCOUNT DIM (7 views)
29. ADM:KEY OFF CD in ADM CLAIM DIM (6 views)
30. ADM BILLING AGGR VW (6 views)
31. Global (5 views)
32. WC POL ST AGGR FACT (5 views)

*FIG. 13*

- Change email address
- Preferences
- Reset password
- User group rights
- User list Recent changes and logs —860

- Gallery of new files
- Logs
- New pages
- Recent changes
- related changes
- Valid change tags
- Watchlist Media reports and uploads —870

- File list
- MIME search
- Search for duplicate files

Data and tools —880

- Popular pages
- Statistics
- System messages
- Version

Redirecting special pages —890

- External links search
- Random page
- Random page in category
- Random redirect
- Redirect by file, user, or revision ID High use pages —893

- Most linked-to categories
- Most linked-to files
- Most linked-to pages
- Most linked-to templates
- Pages with the most categories
- Pages with the most interwikis
- Pages with the most revisions Page tools —895

- Compare pages
- Export pages
- What links here

Other special pages —897

FIG. 14B

SYSTEM FOR ACCESSING BUSINESS METADATA WITHIN A DISTRIBUTED NETWORK

CROSS REFERENCE TO RELATED APPLICATION

This application is a continuation of U.S. patent application Ser. No. 14/499,703, filed Sep. 29, 2014, which is incorporated by reference as if fully set forth.

FIELD OF INVENTION

The present invention is related to metadata and more specifically to a system for accessing business metadata with a distributed network and further for providing a solution to add to the accuracy and veracity of the business data to which the metadata pertains.

BACKGROUND

Metadata is data created to define and label other data, such as images (describing the length, width, etc.), text (describing the topic, length, author, etc.), and, in the case of structural metadata, the architecture of the structures that contain data. Business metadata attempts to add context to data. A Dictionary or Glossary is part of business metadata, and business metadata is directed to making meaning explicit and providing definitions to business terms, data elements, acronyms and abbreviations. Business metadata is the information needed by business metadata users to trust the business data they use to make their decisions. Business metadata may include definitions of tables, columns, and valid values, where the data came from and flows to, what transformations the data undergoes as the data moves, who else is using the data and how much to trust the data, known issues with the data, basic quality profiles such as histograms or percentages of missing values, and other like information.

Traditionally, metadata handling has been addressed as a structured data problem—that is, the heart of the solution is a table-centric database. The structured data approach has led to a long history of mediocrity or failure despite the efforts of many capable people and large-scale projects with strong management backing.

In contrast to structured approaches is the modern thinking around open source, crowd sourcing, social media, more loosely structured data, and other notions largely lumped into the "big data" concept. Foremost among these is the approach taken by Wikipedia of allowing the world to edit the knowledge, and having only a few key people offer some moderate guidelines, approaches, rules, and as-needed, some discipline. At the same time, such approaches must work gracefully with traditional approaches which do provide some elements of value that may continue to be utilized.

Therefore, there is a need for an improved method and system for addressing metadata to enable those in the insurance industry to enhance data that is used in making decisions.

SUMMARY

A system for accessing business metadata within a distributed network is disclosed.

A distributed server system facilitating metadata driven for using social constructs in combination with metadata management to enhance metadata is disclosed. The system includes a data storage device configured to store business information and metadata related to the business information, a processor configured to: selectively receive rated user input that provides supplemental information regarding at least one of the business information and the metadata, wherein the supplemental information is related to the metadata and the structured content within the business information; determine the context of the supplemental information and the at least one of the business information and the metadata; template the supplemental information by type and using pointers in the system to provide non-redundancy, store the organized supplemental information in the data storage device, and generate a user interface element that includes at least one of the stored business information and the metadata related to the business information, and the organized supplemental information, and a display device configured to display the user interface element as the definition of the business information. The system may include organizing the metadata into a taxonomy based on at least the determined context, the taxonomy providing a framework to present the supplemental information. The system may include providing policies governing the use of the supplemental information. The system may include monitoring personal performance within the system for at least one user that provides supplemental information.

A method for providing social constructs in combination with metadata management to enhance metadata for insurance business information for an insurance company is also disclosed. The method includes storing, in a data storage device, business information for an insurance company and metadata related to the business information, receiving user input that provides supplemental information regarding at least one of the business information and the metadata, wherein the supplemental information is related to the metadata and the structured content within the insurance business information, determining the context of the supplemental information and the at least one of the business information and the metadata, storing the organized supplemental information in the data storage device, generating a user interface element that includes at least one of the stored business information and the metadata related to the business information, and the organized supplemental information, and displaying, on a display device, the user interface element as the definition of the business information for an insurance company. The method may include templating the supplemental information by type and using pointers in the system to provide non-redundancy. The method may include organizing the metadata into a taxonomy based on at least the determined context, the taxonomy providing a framework to present the supplemental information. The method may include providing policies governing the use of the supplemental information. The method may include monitoring personal performance within the system for at least one user that provides supplemental information.

A system for using social constructs in combination with metadata management to enhance metadata for insurance business information for an insurance company is disclosed. The system includes a data storage device configured to store business information for an insurance company and metadata related to the business information, a processor configured to: receive user input that provides supplemental information regarding at least one of the business information and the metadata, wherein the supplemental information is related to the metadata and the structured content within the insurance business information, determine the context of the supplemental information and the at least one of the business information and the metadata, store the organized supplemental information in the data storage device, and generate a user interface element that includes at least one of the stored business information and the metadata related to the business information, and the organized supplemental information, and a display device configured to display the user interface element as the definition of the business information for an insurance company. The system may include templating the supplemental information by type and using pointers in the system to provide non-redundancy. The system may include organizing the metadata into a taxonomy based on at least the determined context, the taxonomy providing a framework to present the supplemental information. The system may include providing policies governing the use of the supplemental information. The system may include monitoring personal performance within the system for at least one user that provides supplemental information.

BRIEF DESCRIPTION OF THE DRAWINGS

A more detailed understanding may be had from the following description, given by way of example in conjunction with the accompanying drawings wherein:

FIG. 3 illustrates the use of PROD_RO_CD in the system of the present invention;

FIG. 4 illustrates the definition of PROD_RO_CD in the system as seen by a user of the system;

FIG. 5 illustrates a template page for housing the definition of PROD_RO_CD in the present system;

FIG. 7 illustrates a user input system that allows a user to provide feedback on their view of a page;

FIG. 8 illustrates a depiction of screen identifying information about a category;

FIG. 9 illustrates a depiction of a screen accessed by selecting a single page of FIG. 8;

FIG. 10 illustrates a depiction of a table page;

FIGS. 11A and 11B depict a column selected on the table page of FIG. 10;

FIG. 12 illustrates a screen that depicts the pages in a category;

FIG. 13 illustrate a screen shot of popular pages that may be found in the present system;

FIGS. 14A and 14B illustrate a screen shot of special pages that may be found in the present system;

DETAILED DESCRIPTION OF THE PREFERRED EMBODIMENTS

Figure 1:
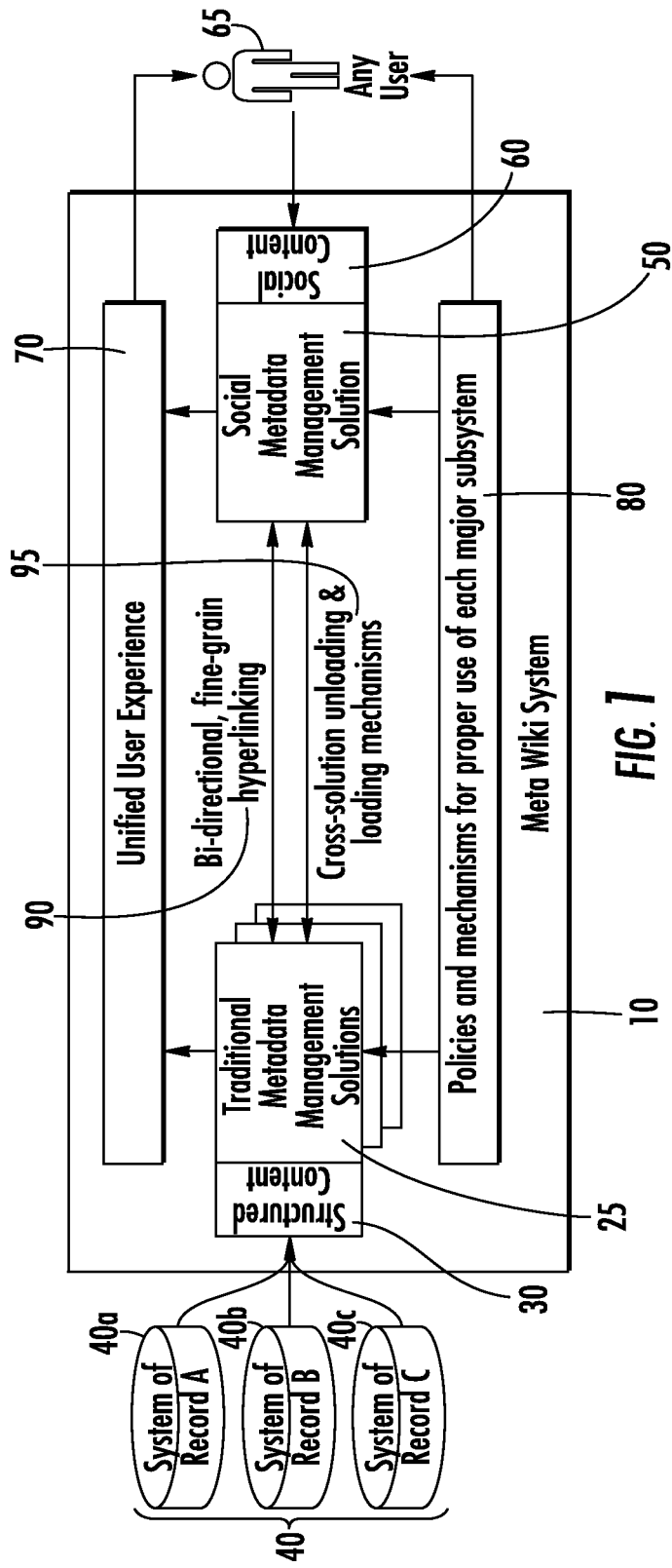
FIG. 1 illustrates a depiction of the overall architecture, wherein the social components are shown in conjunction with source systems and traditional metadata approaches.

Disclosed herein is a social method and apparatus for addressing business metadata from a social perspective using a social perspective to address the need for business metadata management. Part of the present invention involves a robust information taxonomy and proper community processes. Further, metadata is managed in a central repository, providing metadata that is discoverable allowing the relatively uninitiated to find what is needed, enhancing trust in the metadata, and imparting trust about the data described by the metadata.

The present system and method may provide physical data oriented as its first and primary line of solutioning. When business metadata users view a report or screen of data for decision making, they are looking at physical data. The notions of logical and conceptual are useful for early design, but the wiki supports on-the-ground execution. The wiki may be oriented around physical assets, elements, and values.

Broadly, the present invention provides searching/filtering of data within a system for a given content. Once found the context of the content is determined. The content is defined from the content and the context.

More specifically, the present invention provides for a system and method for using social constructs to enhance metadata for insurance business information for an insurance company. The system includes a data storage device configured to store business information for an insurance company and metadata related to the business information. The system includes a processor configured to receive user input that provides supplemental information regarding at least one of the business information and the metadata, determine the context of the supplemental information and the at least one of the business information and the metadata, monitor the supplemental information to provide non-redundancy, organize the metadata into a taxonomy based on at least the determined context, the taxonomy providing a framework to present the supplemental information, store the organized supplemental information in the data storage device, and generate a user interface element that includes at least one of the stored business information and the metadata related to the business information, and the organized supplemental information. The system includes a display device configured to display the user interface element as the definition of the business information for an insurance company.

The present invention provides significant technical improvements to the use of social constructs to enhance metadata for insurance business information for an insurance company. The present invention is directed to more than merely a computer implementation of a routine or conventional activity previously known in the industry as it significantly advances the technical efficiency, access and/or accuracy of the use of social constructs to enhance metadata for insurance business information for an insurance company by implementing a specific new method and system as defined herein. The present invention is a specific advancement in the area of the use of social constructs to enhance metadata for insurance business information for an insurance company by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems.

FIG. 1 illustrates a depiction of the overall architecture of the system 10 of the present invention, wherein the social components are shown in conjunction with source systems and traditional metadata approaches are used in unison. Specifically, system 10, also referred to as MetaWiki system 10, may include social metadata management 50, including social content 60, operating in conjunction with traditional metadata management 25. Management 25, 50 may be combined allowing a user 65 to be provided a unified user experience 70. The combination of management 25, 50 may be governed by policies and mechanisms 80 for proper use of each. The interaction of management 25, 50 may include hyperlinking, including bi-directional, fine-grain hyperlinking, and cross-solution unloading and loading mechanisms 95.

Traditional metadata management 25 may be based on structured content 30. Structured content 30 may include a system of records 40. As shown, system of records 40 may include three distinct records—a system of record A 40a, a system of record B 40b, and a system of record C 40c.

The relationship between traditional metadata management 25 and social metadata management solution 50 may include social metadata management solution 50 communicating with traditional metadata management 25. A URI/URL may be one mechanism that may be used to connect social metadata management solution 50 with traditional metadata management 25. Additional communicating may include bi-directional fine-grain hyperlinking 90 and cross-solution unloading and loading mechanism 95. Each of these mechanism 90, 95 may allow for cross-linking layers of a solution in the communication of social metadata management solution 50 and traditional metadata management 25.

Figure 2:
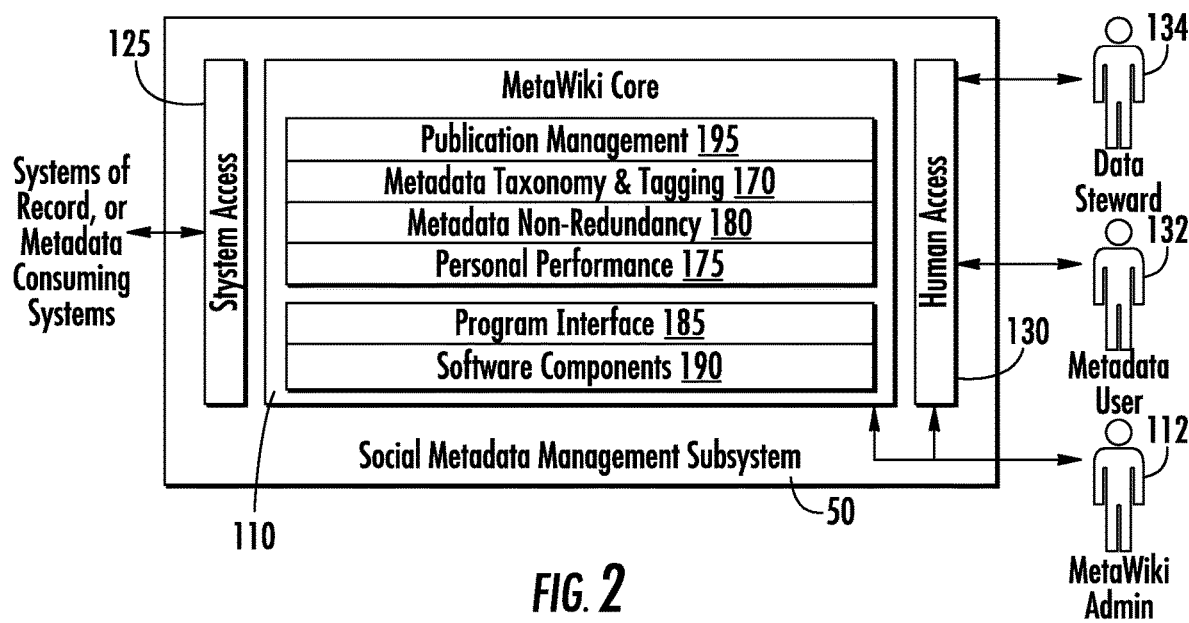
FIG. 2 illustrates a depiction of the system of the present invention.

Referring now additionally to FIG. 2, there is illustrated a depiction of the social metadata management solution 50 of MetaWiki system 10. As shown in FIG. 2, social metadata management solution 50 includes a MetaWiki core 110, human access 130, and system access 125. Metawiki core 110 includes metadata taxonomy and tagging 170, personal performance 175, metadata non-redundancy 180, and publication management 195 may operate simultaneously. MetaWiki core 110 may also include a programing interface 185 and software components 190.

Software components 190 may include any suitable software to perform the described social metadata management solution. By way of non-limiting example, software components 190 may include free, open source wiki software, used to power wiki websites such as Wikipedia, Wiktionary and Commons, developed by the Wikimedia Foundation and others. MetaWiki core 110 may be written in the PHP programming language and uses a backend database. MetaWiki core 110 provides a crowd-sourced, socially-oriented solution. MediaWiki is the software used by Wikipedia and it is one of the most powerful wiki software suites available. MediaWiki may be used in as software to further the present MetaWiki core 110. MediaWiki software includes the LAMP stack—Linux, Apache HTTP Server, MySQL, and PHP.

MetaWiki core 110 may run on the LAMP stack, which includes Linux, Apache Web Server, MySQL Database, and PHP. The acronym LAMP refers to first letters of the four components of a solution stack, composed entirely of free and open-source software, suitable for building high-availability heavy-duty dynamic web sites, and capable of serving tens of thousands of requests simultaneously. The meaning of the LAMP acronym depends on which specific components are used as part of the actual bundle:

Linux, the operating system, i.e. not just the Linux kernel, but also glibc and some other essential components of an operating system, may be used as the operating language. Linux generally is a Unix-like and mostly POSIX-compliant computer operating system assembled under the model of free and open source software development and distribution.)

Apache may be the web server application, such as a browser. While other web server applications may be used, Apache generally supports a variety of features, many implemented as compiled modules which extend the core functionality. Apache provides a variety of Multiprocessing Modules (MPMs) which allow Apache to run in a process-based, hybrid (process and thread) or event-hybrid mode, to better match the demands of each particular infrastructure.

MySQL or MariaDB, the database management system, generally is an open-source relational database management system (RDBMS). The SQL phrase stands for Structured Query Language. Other databases such as those provided by Oracle may also be used.

PHP, Perl, or Python, are scripting languages (respectively programming languages) used for dynamic web pages and web development. Within system 50 PHP may be used by the Wiki Admins 112. PHP is a popular general-purpose scripting language that is especially suited to web development. Generally regarded as fast, flexible and pragmatic, PHP powers everything from blogs to the most popular websites in the world. Other languages may be used as the present invention is not tied specifically to PHP.

The MetaWiki core 110 may be accessed by metadata user 132 and data steward 134 via a human access 130. Wiki Developers may develop the system 50, or aspects within system 50, by writing code in a software language. Human access 130 may include a browser which may include a software application for retrieving, presenting and traversing information resources on the World Wide Web or information in private networks or files in file systems. An information resource is identified by a Uniform Resource Identifier (URI/URL) and may be a web page, image, video or other piece of content. Other links to information resources may also be used. Hyperlinks present in resources enable users easily to navigate their browsers to related resources. Browser may take the form of a major web browser such as Firefox, Internet Explorer, Google Chrome, Opera, and Safari, for example.

System access 125 may include hyperlinks, may take the form of a data dictionary, or something in between like XML messages. System access 125 may take the form of Python, by way of non-limiting example only.

A data dictionary may be a collection of descriptions of the data objects or items in system 50 for the benefit of metadata users 132, data stewards 134, and Wiki admins 112. To provide an initial basis, MetaWiki core 110 needs to include some existing content, even though eventually direct editing may make the startup content at least partially obsolete. Further, there may be value in loading spreadsheets first in the future, so the spreadsheet loading functionality must be available indefinitely.

A data dictionary as defined in the IBM Dictionary of Computing is a "centralized repository of information about data such as meaning, relationships to other data, origin, usage, and format." The term can have one of several closely related meanings pertaining to databases and database management systems (DBMS) including a document describing a database or collection of databases, an integral component of a DBMS that is required to determine its structure, and a piece of middleware that extends or supplants the native data dictionary of a DBMS. While each of these definitions pertains to the dictionary of system 50, dictionary may provide a proverbial starting point for the evolution of data assets. Ultimately, the data asset may evolve and make the dictionary unnecessary.

Python may be used as the language for Wiki developers of the present application. Other languages may also be used. Python may be used for general programing. The code to load MetaWiki core 110 may be Python.

MetaWiki core 110 may provide information taxonomy 170 of data, personal performance 175 metrics, provide for non-redundancy 180 of information and may provide a programming interface 185.

Metadata taxonomy and tagging 170 may take the form of a category or data asset, and within the category or data asset is a table or set of tables, and further within each table is a column or set of column pages. Taxonomy refers to the concept of a classification system like the taxonomy of animals, for example. Tagging refers to the use of tags, such as the way people tag music on their music players. This taxonomy and tagging will be described within the screen shots of MetaWiki system 10 herein below.

Metadata non-redundancy 180 may be included within MetaWiki core 110. In MetaWiki core 110, the potential exists for one concept to be in hundreds of physical places. MetaWiki system 10 may include mechanisms to optimize repeating notions. For example, the column "Regional Office" may appear in dozens of places. This term need not be defined, and in many instances would be undesirable to define in multiple places, necessitating non-redundancy. Each data asset may be defined once in MetaWiki system 10, and reused at various levels (Enterprise, Segment [Commercial, Consumer, etc.], Line, Asset, etc.). MetaWiki core 110 may enable an asset to be defined once and have that definition used anywhere that asset occurs. A pointer may be used in place of the asset definition, and that pointer may ultimately point to the specific location of the data asset definition within MetaWiki core 110. For example, in FIG. 3 there is shown an illustration of the use of PROD_RO_CD. PROD_RO_CD appears 20 times in the environment as given by the count 1210. By interacting with the system, a user may proceed to the page for PROD_RO_CD. As may be seen in FIG. 4, the definition 1310 of PROD_RO_CD may be presented as "The code which represents the regional office that underwrote the policy." However, it is not necessary to provide this definition for all 20 instances of PROD_RO_CD. Instead, in markup language the page where definition is included actually includes a tag:

{{PROD_RO_CD}}

This markup language actually makes a call to a template page shown in FIG. 5. As may be seen in FIG. 5, the definition for PROD_RO_CD may be defined 1410 in a single place, a template page, allowing the markup language on the other pages to call for the definition when needed. This definition 1410 may be pasted into the page in the place of the markup language calling to the template page. This enables the system to prevent the occurrence of multiple definitions for a single variable or term.

Publication management 195 includes using already published content, contributing new content by a user such that it is not stewarded, use of a discussion area as opposed to main pages, and the stewardship processes that allows some user content to be screened by stewards, content entirely owned by the stewards, and pages that may be read-only.

Within the present description Analytics Data Mart (ADM) is utilized to provide specific examples of the metadata in the wiki and demonstrating the primary metadata solution. Within the MetaWiki core 110 there may be data assets, such as ADM in the present example. These data assets may be commented on, or utilized by users of the MetaWiki core 110. These comments may then be conjoined with the information regarding the data asset thereby evolving the data asset through users comment or use. Since this is the only place the data asset is stored, each use of the data asset within the company may define the data asset. The default behavior of MetaWiki core 110 may be to allow social contributions to immediately be part of the evolving metadata definition. This may be based on the primary assumption of the design—the wisdom of crowds may evolve into powerful knowledge for managing insurance metadata. Such contributions may be immediately visible, and it may be incumbent upon all contributors to edit, delete, or otherwise challenge such contributions directly with each other. For example, if Earned Premium exists in a data asset, but is undefined, and a first metadata user 132 and a second metadata user 132 disagree on the definition, each metadata user 132 may contribute a perspective on the definition directly in the MetaWiki core 110 until reaching consensus.

Consensus is not guaranteed to be reached. In fact, there may be instances where a consensus cannot be reached. For such cases, or other cases where the data asset being described in metadata is of sufficiently high value, such as a situation where the data asset is included in the annual report or is under SOX compliance, a data steward 134 may be notified that the data asset has evolved. It may be incumbent upon the data steward 134 to acknowledge the evolution of the asset before the asset evolution is set to occur. The data steward 134 may be granted a certain time within which to view the evolved asset, otherwise the evolution of the asset will be set.

In addition to evolving the data asset, the user that submitted information may evolve their profile within the social ecosystem. Personal performance 175 metrics may be tracked and accounted for all or some users. Since the present invention is based on business metadata being a social problem, the present invention provides the ability to quickly, easily, and routinely measure user performance down to an individual level. MetaWiki core 110 may provide the ability to monitor or track what people contributed, the quality of the contribution, how the contribution was used, for example. MetaWiki core 110 provides the components to monitor personal performance 175. An individual's personal performance 175 may be included for the users review or the like.

Figure 6:
FIG. 6 illustrates a user page that includes scores associated with a user.

Referring now also to FIG. 6, there is illustrated a user page that includes scores associated with a user. As shown in FIG. 6, a user may be identified by their name 1010. The rank 1020 of the user may be displayed along with a lifetime score 1030 and any steward abilities 1040. Further, system 10 may track and present contributions 1050, content rating 1060 gifts given 1070 and gifts received 1080 for each user. Contributions 1050, content rating 1060, gifts given 1070 and gifts received 1080 may be tracked over a myriad of timeframes such as a rolling month, rolling year, and lifetime, by way of example.

The user may gain experience points, for example, for providing information and may receive additional points each time that information is accessed or used. As the experience points of a user grow, that user may become a higher valued member of the social ecosystem. For example, after submission of a certain number of accepted or approved information, the user may increase a level. The levels of the user may determine the attributes that may be modified by the user within the system. For example, in the case of a high value data asset, the data steward 134 review of information may be rendered unnecessary if the provider of the information is above a certain level. For example, a new user may start with zero experience points. At this level of experience, a user may be allowed to edit pages not under control of data stewards 134, and may be prevented from editing pages under data steward 134 control. For each edit that a user makes where allowed, the user may earn 3 points, for example. The user may also get an additional point for each other user who votes in favor of the user's contribution. After a few contributions and votes, the user's experience may cross a threshold, such as 50 points, at which point the user may be permitted to edit stewarded pages, for example, but may still be prevented from starting their own entirely new pages. Then at 100 points, for example, the user may be permitted to add entirely new pages. At 1,000 points, for example, the user may become candidates to become data stewards. The activities, points, and rights may be used to provide a mechanism to drive the community to build a strong metadata environment for insurance business decision making.

For example, a user may be able to not only contribute content to a page, but also be able to rate pages. Referring now also to FIG. 7, there is shown a user input system that allows a user to provide feedback on their view of a page. As shown in FIG. 7, a user may provide feedback in the reliability 1110, completeness 1120, neutrality 1130, and presentation 1140 of a page. In each category of feedback, the user may have the option of selecting from a drop down menu, for example, a scoring system such as excellent, high, fair, low, poor, or unsure, by way of example only. Averages of the respective categories may be maintained for each page in the system allowing feedback and system monitoring at the page level to occur.

The social reputation may be leveraged for business metadata and business decision making. This may even include measuring for the purpose of people's HR objectives and reviews. As set forth above, a user's contribution may be measured and monitored. In this way, the user contributions may be used and provide for HR purposes. The reputation functionality may be included in MetaWiki system 10 such as by using the reputation functionality as a measure of the trust of the data assets to which a reputed user contributed. Conceptually, the idea that a user can trust (or not) data assets not based on the asset alone, and not because of what IT tells users when they deliver it, but on the comments, scores, and reputations of the business people using the data asset.

MetaWiki system 10 provides automated ways to maintain programmatic and social content. In the past, social interfaces have had problems that people can make things incomplete or inaccurate, necessitating the need for other users to review and improve the content. MetaWiki system 10 provides mechanisms that allow for the optimal balance of social contribution with automated additions/updates/improvements for labor savings or consistency of content and presentation. For example, if people define "widget" in different places over time within MetaWiki system 10, and a definition of "widget" for the company as a whole is determined, MetaWiki system 10 may use automation to find all occurrences of "widget", remove them, and put in place a more efficient handling of a centralized definition, such as that show in FIG. 5 and discussed previously.

MetaWiki system 10 may include stewardship 134 and release management of social contributions. While the wisdom of crowds generally converges to the right answer, MetaWiki system 10 may additionally provide a layer of stewardship 134 between some content contributions and their view in the community. Such stewardship may be used for critical content. In such cases, the data steward 134 may be notified, allowing steward 134 to release, hold, or deny changes, for example. This layer of control aids the balance of the traditional metadata management solution 25 and social metadata management solution 50 from devolving into the more open crowd contribution in the public domain on the one hand and still maintaining reasonable controls in an insurance decision making context.

Metadata data describes data in some data asset, such as a data mart or other data repository. MetaWiki system 10 may define a structure, likely primarily hierarchical, but also likely fully interconnected, to label, group, and otherwise organize metadata and data assets.

Community contribution and consumption is overwhelmingly the measure of success. MetaWiki core 110 meets the need for business metadata users 132 to easily access and trust their metadata via browser 130. MetaWiki core 110 provides the needed connection from business metadata to technical metadata. MetaWiki core 110 provides an information taxonomy 170 that defines hierarchies, navigation methods, best practices, while providing a stewardship and governance process around the content.

Referring now to FIG. 8, there is a depiction of screen 200 identifying information about a category. Screen 200 includes a category for Data Asset 210. Screen 200 further provides a definition 220 of the shown category. In this case for Data Asset 210, definition 220 includes that a data asset is the general name for any variety of warehouses, marts, reports, staging areas, feeds, or any other construct capable of holding data, such that the construct is in some way directly accessed by business metadata users. Screen 200 includes a listing of pages in the depicted category in this example Data Asset 210. In this example, the category Data Asset 210 only includes a single page ADM 240.

ADM is provided as an example herein. This is an example only to aid in understanding the present invention of the use of a wiki for business metadata is now part of that pilot nature. Certainly other programs and data assets may be defined and used in the present invention, which may result in thousands of such entries in a large insurance company.

Referring now to FIG. 9, there is a depiction of a screen accessed by selecting single page ADM 240 of FIG. 8. ADM 240 may include a definition 310 of the selected page. In this example, definition 310 defines ADM as a research data asset which will contain all core commercial data, in one "mart," regardless of source. This containment may allow easy access to data across sources, and ensure consistency, reusability and accuracy. Tables 320 accessible within page ADM 240 may be presented. The tables may include a short definition of each of the tables 320 within the page. ADM_ACCOUNT_DIM 320a includes a short definition of the nature of the attributes to be found on the table. Page 240 may include an identification of content experts 330, which for page ADM 240 includes Terry Mullen-Sweeney, Jim King. Page 240 may also include an area for presentation of questions/answers 340. As would be evident, each of the respective pieces of content may be presented as a clickable unit. For example, the entries within a given table may be presented in hypertext that upon activation, either by clicking, hovering, or automatic activation, navigates to the respective underlying page. Such a page may be from navigating from the table to the page, or from the page to the definition, for example.

Referring now to FIG. 10, there is shown a depiction of a table page for ADM_ACCOUNT_DIM 320a. As is shown in FIG. 10, a table page may include an identification of the full path 410, a description 420 of the table, and columns 430 that are found within the table. Specifically for the ADM_ACCOUNT_DIM example, full path 410 may include Assets|ADM|ADM_ACCOUNT_DIM. Description 420 is shown as The Account Description contains information sourced from the Account Insured Facility (AIF) containing information about the account. Columns 430 are shown to include columns from Account Identifier to SRCE_SYS_CD. In a similar fashion to the tables on the previous page, the columns may provide a status of each particular column.

FIGS. 11A and 11B depict a column selected in FIG. 10. In this example, the column BEGINNING_CONS_EFF_YR 510 is depicted. The column provides a full path 515. In this case, the full path 515 may include Assets|ADM|ADM_ACCOUNT_DIM|BEGINNING_CONS_EFF_YR. A business name 520 may also be presented for a column. In this case, for column BEGINNING_CONS_EFF_YR the business name 520 may include Beginning Consecutive Effective Year. A definition 525 for the column may be provided. In the on-going example, the definition may include "the first year of the most recent string (consecutive) of active account years. The column page may also include a Data Type 530 such as NUMBER(4), for example.

The column depiction may include contents 535. This may include lineage 540, valid values 545, context 550, example 555, known issues 560, system of record 565, edits and transformations 570 including downstream use 575, ownership 580, and subject matter experts 585

Lineage 540 may include move type, source asset, source schema, source table, source field, and source data type/size. Valid values 545 may include values that are self-explanatory as shown, such as dollars and cents for financial fields. Valid values 545 may also contain enumerated lists such as "Male" and "Female" for gender, or other data sets depending on the nature of the metadata element. Context 550 may include information used to calculate, in this example, the Number of Consecutive Years with HIG and the LOB Consecutive Years with HIG. Examples 555 of the column in use may be provided. This may include ACCT_ID_POL_EFF_YR and other exemplary values.

Known issues 560 with the column may be identified. In the exemplary column, a known issue 560 includes that at this point the earliest effective year will be 2005 due to the history attached to the Account ID and provides that this issue will be corrected in June 2014. The column may include individuals for ownership 580, and identify subject matter experts 585.

FIG. 12 illustrates a screen that depicts the pages 620 in a category 610. This is one manifestation of the underlying taxonomy and tagging functionality previously discussed. The system reads the taxonomy and tagging architecture and renders it in various manners for social consumption, such as FIG. 12. The exemplary depiction includes a category 610 of ADM Column List. The pages 620 in this include 200 pages in the category.

FIG. 13 illustrates a screen shot of popular pages 710 that may be found in the present system. This may include a list of pages 720 including the number of views for each. In the example shown in FIG. 13, the top fifty pages are shown.

Figure 14A:

FIGS. 14A and 14B illustrate a screen shot of special pages 810 that may be found in the present system. Special pages 810 may include maintenance reports 820, lists of pages 830, login/create account 840, users and rights 850, recent changes and logs 860, media reports and uploads 870, data and tools 880, redirecting special pages 890, high use pages 893, page tools 895, and other special pages 897.

Maintenance reports 820 may include broken redirects, dead-end pages, double redirects, long pages, oldest pages, orphaned pages, pages with fewest revisions, pages without language links, protected pages, protected titles, short pages, uncategorized categories, uncategorized files, uncategorized pages, uncategorized templates, unused categories, unused files, unused templates, wanted categories, wanted files, wanted pages and wanted templates.

Lists of pages 830 may include all pages, all pages with prefix, categories, lists of redirects, pages with a page property and search.

Users and rights 850 may include active user lists, blocked users, change email address, preferences, reset password, reset tokens, user contributions, user group rights and user list.

Recent changes and logs 860 may include gallery of new files, logs, new pages, recent changes, related changes, valid change tags and watchlist, for example.

Media reports and uploads 870 may include file list, MIME search and search for duplicate files. Data tools 880 may include popular pages as discussed with respect to FIG. 13, statistics, system messages and version information.

Redirecting special pages 890 may include external links search, random page, random page category, random redirect and redirect by file, user, or revision ID. High use pages 893 may include most linked-to categories, files, pages, and templates, and pages with the most categories, interwikis, and revisions. Page tools 895 may include compare pages, export pages, and what links here.

Figure 15:
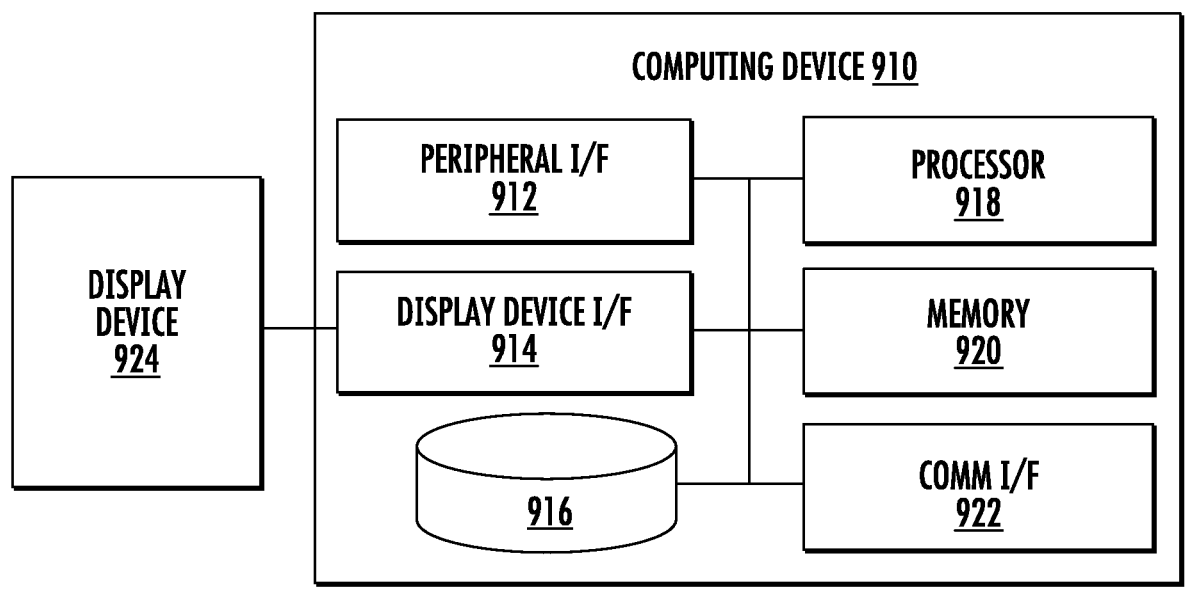
FIG. 15 shows an example computing device that may be used to implement features described above with reference to FIGS. 1-14.

FIG. 15 shows an example computing device 910 that may be used to implement features described above with reference to FIGS. 1-14. The computing device 910 includes a processor 918, memory device 920, communication interface 922, peripheral device interface 912, display device interface 914, and data storage device 916. FIG. 15 also shows a display device 924, which may be coupled to or included within the computing device 910.

The memory device 920 may be or include a device such as a Dynamic Random Access Memory (D-RAM), Static RAM (S-RAM), or other RAM or a flash memory. The data storage device 916 may be or include a hard disk, a magneto-optical medium, an optical medium such as a CD-ROM, a digital versatile disk (DVDs), or Blu-Ray disc (BD), or other type of device for electronic data storage.

The communication interface 922 may be, for example, a communications port, a wired transceiver, a wireless transceiver, and/or a network card. The communication interface 922 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 912 is configured to communicate with one or more peripheral devices. The peripheral device interface 912 operates using a technology such as Universal Serial Bus (USB), PS/2, Bluetooth, infrared, serial port, parallel port, and/or other appropriate technology. The peripheral device interface 912 may, for example, receive input data from an input device such as a keyboard, a mouse, a trackball, a touch screen, a touch pad, a stylus pad, and/or other device. Alternatively or additionally, the peripheral device interface 912 may communicate output data to a printer that is attached to the computing device 910 via the peripheral device interface 912.

The display device interface 914 may be an interface configured to communicate data to display device 924. The display device 924 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 914 may operate using technology such as Video Graphics Array (VGA), Super VGA (S-VGA), Digital Visual Interface (DVI), High-Definition Multimedia Interface (HDMI), or other appropriate technology. The display device interface 914 may communicate display data from the processor 918 to the display device 924 for display by the display device 924. As shown in FIG. 15, the display device 924 may be external to the computing device 910, and coupled to the computing device 910 via the display device interface 914. Alternatively, the display device 924 may be included in the computing device 900.

An instance of the computing device 910 of FIG. 15 may be configured to perform any feature or any combination of features described above as performed. Alternatively or additionally, the memory device 920 and/or the data storage device 916 may store instructions which, when executed by the processor 918, cause the processor 918 to perform any feature or any combination of features described above as performed. Alternatively or additionally, each or any of the features described above as performed may be performed by the processor 918 in conjunction with the memory device 920, communication interface 922, peripheral device interface 912, display device interface 914, and/or storage device 916.

Figure 16:
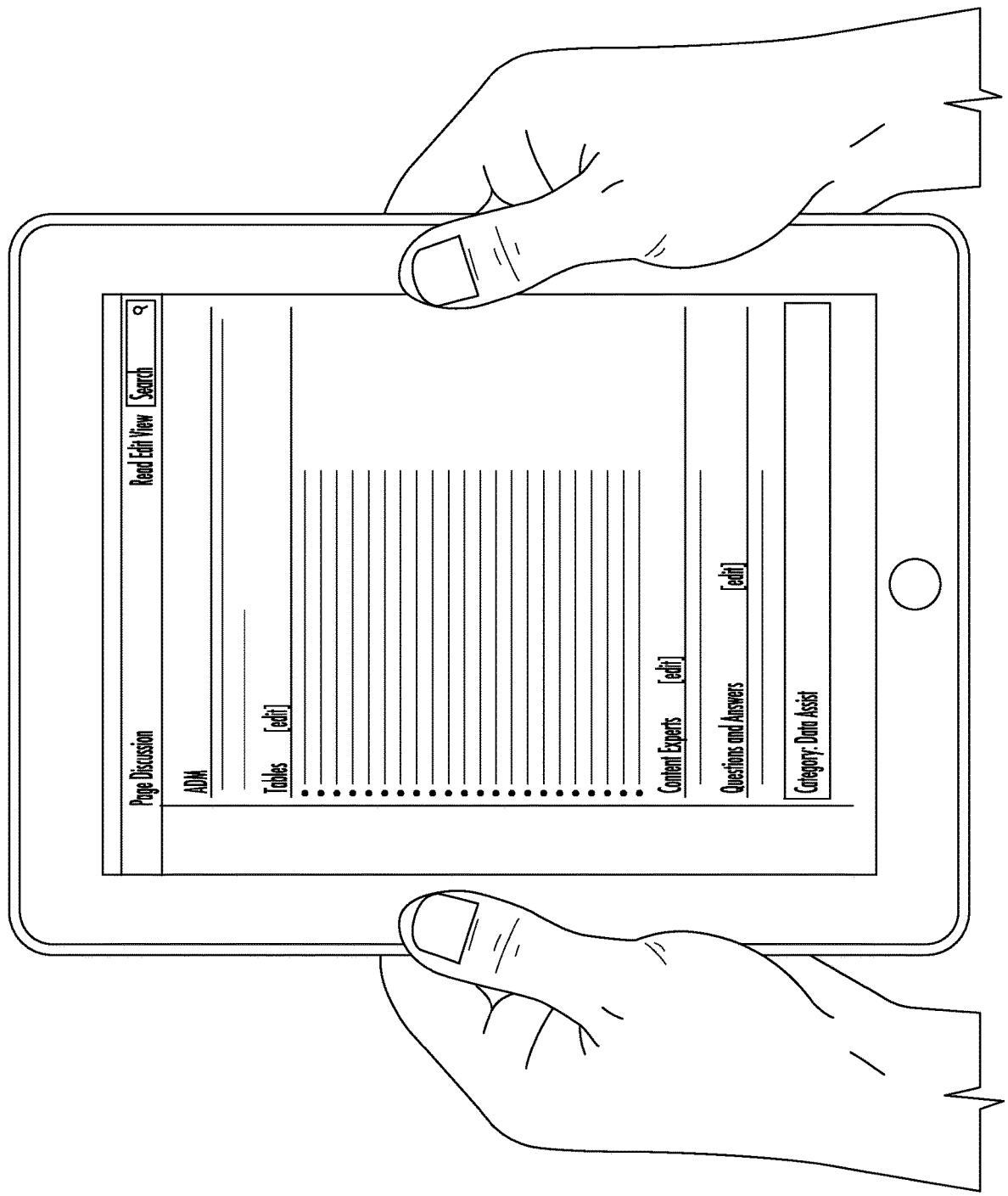
FIG. 16 shows a tablet computer that is a more specific example of the computing device of FIG. 15.

FIG. 16 shows a tablet computer that is a more specific example of the computing device 910 of FIG. 15. The tablet computer may include a processor (not depicted), memory device (not depicted), communication interface (not depicted), peripheral device interface (not depicted), display device interface (not depicted), storage device (not depicted), and touch screen display, which may possess characteristics of the processor 918, memory device 920, communication interface 922, peripheral device interface 912, display device interface 914, storage device 916, and display device 924, respectively, as described above with reference to FIG. 15. The touch screen display may receive user input using technology such as, for example, resistive sensing technology, capacitive sensing technology, optical sensing technology, or any other appropriate touch-sensing technology.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features are described above with reference to the example MetaWiki system 10 of FIGS. 1 and 2 for a system and method for socially solving business metadata, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-16 may be used alone without the other features and elements or in various combinations with or without other features and elements. Sub-elements of the methods and features described above with reference to FIGS. 1-16 may be performed in any arbitrary order (including concurrently), in any combination or sub-combination.

What is claimed is:

1. A distributed server system facilitating metadata driven for using social constructs in combination with metadata management to enhance metadata, the system comprising:
   a data storage device configured to store business information and metadata related to the business information;
   a processor configured to:
      selectively receive rated user input that provides supplemental information related to an instance of a social construct associated with at least one of the business information and the metadata;
      determine a context of the supplemental information;
      organize the supplemental information in a taxonomy by type using at least one of category or data asset and use pointers to provide non-redundancy of the supplemental information to provide a single definition of the supplemental information, wherein the pointer is used in place of the supplemental information, the pointer pointing to a specific location of the data asset;
      cross-link the supplemental information to the associated metadata;
      store the cross-linked supplemental information in the data storage device;
      provide policies governing the use of the supplemental information;
      monitor personal performance within the system for at least one user that provides supplemental information; and
      generate a user interface element that includes at least one of the stored business information and the associated metadata related to the business information, and the linked supplemental information; and
   a display device configured to display the user interface element as the definition of the business information.

2. The system of claim 1, wherein non-redundancy is included within a metawiki core.

3. The system of claim 1, further comprising organizing the metadata into a taxonomy based on at least the determined context, the taxonomy providing a framework to present the supplemental information.

4. The system of claim 1, wherein the use includes creation, modification and review.

5. The system of claim 1, wherein the monitoring comprises creating a ranking for the at least one user.

6. The system of claim 1, wherein the monitoring includes information regarding the at least one users ability to provide stewardship for the supplemental information.

7. The system of claim 1, wherein the monitoring includes tracking contributions to the system by the at least one user.

8. The system of claim 1, wherein the monitoring includes rating the content provided by the at least one user.

9. The system of claim 1, wherein the received user input includes a user's rating of content provided by another user.

10. A method for providing social constructs in combination with metadata management to enhance metadata for insurance business information for an insurance company, the method comprising:

storing, in a data storage device, business information for an insurance company and metadata related to the business information;

receiving user input that provides supplemental information related to an instance of a social construct associated with at least one of the business information and the metadata;

determining the context of the supplemental information;

organizing the supplemental information in a taxonomy by type using at least one of category or data asset and using pointers to provide non-redundancy of the supplemental information to provide a single definition of the supplemental information, wherein the pointer is used in place of the supplemental information, the pointer pointing to a specific location of the data asset;

cross-linking the supplemental information to the associated metadata;

storing the cross-linked supplemental information in the data storage device;

providing policies governing the use of the supplemental information;

monitoring personal performance within the system for at least one user that provides supplemental information;

generating a user interface element that includes at least one of the stored business information and the metadata related to the business information, and the linked supplemental information; and displaying, on a display device, the user interface element as the definition of the business information for an insurance company.

11. The method of claim 10, further comprising templating the supplemental information by type and using pointers in the system to provide non-redundancy.

12. The method of claim 10, further comprising organizing the metadata into a taxonomy based on at least the determined context, the taxonomy providing a framework to present the supplemental information.

13. A system using social constructs in combination with metadata management to enhance metadata for insurance business information for an insurance company, the system comprising:

a data storage device configured to store business information for an insurance company and metadata related to the business information;

a processor configured to:
  receive user input that provides supplemental information related to an instance of a social construct associated with at least one of the business information and the metadata;
  determine the context of the supplemental information;
  organize the supplemental information in a taxonomy by type using at least one of category or data asset and use pointers to provide non-redundancy of the supplemental information to provide a single definition of the supplemental information, wherein the pointer is used in place of the supplemental information, the pointer pointing to a specific location of the data asset;
  cross-link the supplemental information to the associated metadata;
  store the cross-linked supplemental information in the data storage device;
  provide policies governing the use of the supplemental information;
  monitor personal performance within the system for at least one user that provides supplemental information; and
  generate a user interface element that includes at least one of the stored business information and the associated metadata related to the business information, and the linked supplemental information; and a display device configured to display the user interface element as the definition of the business information for an insurance company.

14. The system of claim 13, further comprising templating the supplemental information by type and using pointers in the system to provide non-redundancy.

15. The system of claim 13, further comprising organizing the metadata into a taxonomy based on at least the determined context, the taxonomy providing a framework to present the supplemental information.

* * * * *